United States Patent [19]

Shigematsu et al.

[11] Patent Number: 4,840,482
[45] Date of Patent: Jun. 20, 1989

[54] METHOD OF COATED FIBER IDENTIFICATION IN OPTICAL TRANSMISSION NETWORK

[75] Inventors: Masayuki Shigematsu; Shuzo Suzuki, both of Kanagawa, Japan

[73] Assignee: Sumitomo Electric Industries, Ltd., Osaka, Japan

[21] Appl. No.: 182,022

[22] Filed: Apr. 15, 1988

[30] Foreign Application Priority Data

Apr. 17, 1987 [JP] Japan ................... 62-95892

[51] Int. Cl.$^4$ .......................... G01N 21/84
[52] U.S. Cl. .................. 356/73.1; 73/800; 250/227
[58] Field of Search ........ 356/73.1; 250/227; 73/800, 849

[56] References Cited

U.S. PATENT DOCUMENTS

3,651,273 3/1972 Halfmann .
4,672,198 6/1987 Presby .................. 356/73.1 X

Primary Examiner—Vincent P. McGraw
Attorney, Agent, or Firm—Cushman, Darby & Cushman

[57] ABSTRACT

A method of identifying an aimed coated fiber in an optical transmission network. Identification of the aimed coated fiber in the optical transmission network is accomplished between its upstream and downstream ends during transmission of an optical signal without disrupting the capabilities of an optical communication network or causing deterioration of the optical signal being transmitted.

6 Claims, 6 Drawing Sheets

METHOD OF COATED FIBER IDENTIFICATION IN OPTICAL TRANSMISSION NETWORK

BACKGROUND OF THE INVENTION

(1) Field of the Invention

The present invention relates to a method of fiber identification in an optical transmission network by which identification of an aimed coated fiber in an optical transmission network can be accomplished between its upstream and downstream ends during transmission of an optical signal. In this case, an optical fiber cable is composed of a plurality of the coated fibers, and a single-fiber, a multi-fiber, a ribbon-fiber etc. are commertially available for a preferred example of the coated fibers.

(2) Description of the Prior Art

A vigorous research and development program is going forward on commercial communications systems using silica-based optical fibers as transmission lines. In Japan, a large-capacity system (F-400M) as well as a medium and a small-capacity system (F-32M and F-100M) have been commercially available for interoffice trunking in public communications circuits and a 400 Mb/s capacity communications system is available today. Furthermore, in order to accommodate the versatility of services to be anticipated in the further communications systems, the application of a lightguide communications system to feeder and subscriber loops is under review.

For successful replacement of metallic cables such as coaxial cables by optical fiber cables, it is important to establish reliable maintenance technology for optical transmission network. In the maintenance of optical transmission network, a line switching technique that enables an active line to be switched to an auxiliary or spare line between interoffice subscriber terminals, and a line monitoring technique by which a lineman can check to see if an active line of interest is busy or if the line to be switched is exactly what it should be are indispensable. Optical transmission network maintenance work involving these techniques has been accomplished by removing the connector from either end of an optical fiber cable and reconnecting it to a detector or an auxiliary or spare line.

A major problem with the line monitoring and switching job is that it causes interruption of communications over the line to be monitored or switched and therefore that it cannot be executed with lines in ordinary use. Interruption of communications on account of maintenance or repair work must be avoided by all means in communication circuits, in particular, in subscriber loops. Unless this problem is solved in a satisfactory way, optical fiber communication systems cannot be applied to subscriber loops.

Monitoring of optical communication circuits is currently accomplished by the combination of Local Injection (LI) and Local Detection (LD) methods that have been used in practice for fusion splicing. An example of the local injection (LI) method is disclosed in Published Unexamined Japanese Patent Application No. 270706/1986 and an example of the local detection (LD) method is disclosed in Published Unexamined Japanese Patent Application No. 270707/1986. This technique involves bending a bundle of optical fibers in a cable at two distant locations and injecting light into the fiber at one bent portion while detecting radiated light that leaks from the fiber at the other bent portion.

Figure 1A:
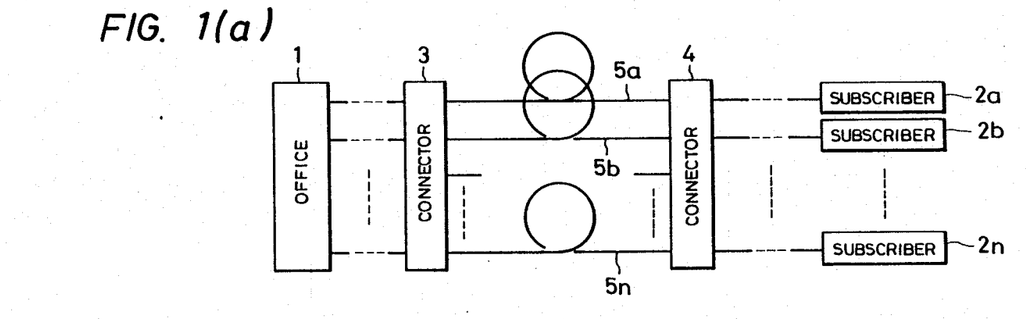
FIGS. 1(a) and 1(b) are diagrams illustrating a prior art method of fiber identification.

The prior art of this monitoring technique is illustrated in FIG. 1 with reference to the case where, as shown in FIG. 1(a), an office 1 is connected to subscribers 2a, 2b . . . and 2n via the corresponding number of coated fibers 5a to 5n that are installed between a connector 3 on the office side and a connector 4 on the subscriber side in such a way as to provide for bidirectional communication. If an installed coated fiber 5n is to be replaced by a new one, the identification of the fiber 5n has to be established between the connector 3 on the office side and the connector 4 on the subscriber side.

Figure 1B:
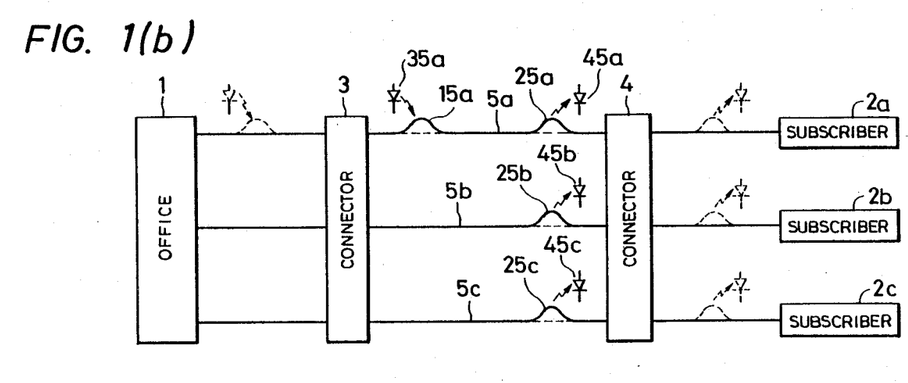

This need has been conventionally met by using the combination of LI and LD methods as shown in FIG. 1(b). First, coated fibers 5a, 5b and 5c are bent in the area near the connector 4 on the subscriber side to form bent portions 25a, 25b and 25c and radiated light leaking from these portions is detected with detectors 45a, 45b and 45c, respectively (LD method). In the next place, another bend 15a is formed in the fiber 5a to be identified, and light is injected into that bent portion of the fiber from a light-emitting device 35a (LI method). Since the injected light is picked up only by the light-receiving device 45a associated with the fiber 5a, identification of the latter can be accomplished.

Coated fiber identification can also be made by bending the fibers 5a to 5n in the area near the office 1 or the subscribers 2a to 2n as indicated by dashed lines in FIG. 1(b).

The prior art method of coated fiber identification described above has the following disadvantages.

First, in order to inject an adequate power of light into the coated fiber by the LI method, the fiber must be bent with a small radius of curvature. However, if the fiber bend has a small radius of curvature, radiated light of a large power will leak from the bent portion of the fiber to which the LI method is to be applied and this can cause deterioration of the signal to be transmitted. Therefore, if the LI method is applied during transmission of an optical signal, troubles such as channel interruption will occur in optical signal communication, and in an extreme case, cracking might occur in the coated fiber.

Secondly, if a light having a power greater than a certain level is injected into a coated fiber by the LI method, it will be transmitted even to the office or subscribers resulting in an occurrence of another noise component that deteriorates the optical signal to be transmitted.

SUMMARY OF THE INVENTION

In view of the above described drawbacks accompanying the prior art method, an object, therefore, of the present invention is to provide a method that allows for reliable identification of coated fibers in an optical transmission network during transmission of an optical signal without disrupting the capabilities of a optical signal communication channel or causing deterioration of the optical signal being transmitted.

The above and, other objects of the present invention is accompanied by the provision of a method of coated fiber identification in an optical transmission network according to the first aspect of the present invention comprises the first step in which the plurality of coated fibers in the optical transmission network are bent at its downstream end to produce radiated light and the levels of radiated light produced in the respective fibers are measured, the second step in which the fiber to be identified or all other fibers are bent at the upstream end of the optical transmission network, with all fibers remaining bent at the downstream end, and the levels of radiated light produced in the respective fibers at the downstream end are measured, and the third step in which the levels of radiated light measured in said second step are compared with those of radiated light measured in the first step and the fiber that has experienced a drop in the level of radiated light or the fiber that has not experienced any such drop is selected as the one which is identical to the fiber to be identified.

A method of identification in an optical transmission network according to the second aspect of the present invention comprises the first step in which the plurality of fibers in the optical transmission network are bent at both the upstream and downstream ends thereof during transmission of an optical signal to produce radiated light and the levels of radiated light produced in the respective fibers at the downstream end are measured, the second step in which the bends at the upstream end of the fiber to be identified or of all other fibers are removed but the plurality of fibers remain bent at their downstream end so as to produce radiated light, and the levels of radiated light produced in the respective fibers at the downstream end are measured, and the third step in which the levels of radiated light measured in said second step are compared with those of radiated light measured in the first step and the fiber that experienced an increase in the level of radiated light or the fiber that has not experienced any such increase is selected as the one which is identical to the fiber to be identified.

The first and second aspects of the present invention relating to a method of fiber identification in an optical transmission network have the features described above and the fiber to be identified or all other fibers are bent at the upstream end of the optical signal (that is, at a position near to an optical signal source) so as to cause an increase or decrease in the level of radiated light produced in the bent portions of the fibers at the downstream end thereof (at a position far from the optical signal source). Correct coated fiber identification can be made by observing the resulting increase or decrease in radiated light.

Modifications are possible without departing from the above first and second aspects of the present invention. For example, the coated fiber identification is accomplished by a method comprises the steps of bending one of said coated fibers at a downstream end side thereof far from an optical signal source to produce radiated light from the bent portion thereof; measuring the first levels of the radiated light produced at the downstream end side; bending the aimed coated fiber to be identified at the upstream end side of the optical transmission network; measuring the second level of the radiated light produced in the one of said coated fibers at the downstream end side; and comparing the second level of radiated light with the first level of radiated light to detect variation in the level of radiated light, said steps being repeatedly carried out until the variation occurs and the aimed coated fiber being identified according to the detected variation.

DESCRIPTION OF THE PREFERRED EMBODIMENTS

Embodiments of the first and second aspects of the present invention are described hereinafter with reference to FIGS. 2(a) to 6. In the figures, like elements are identified by like numerals and redundant explanation will be omitted.

Figure 2A:
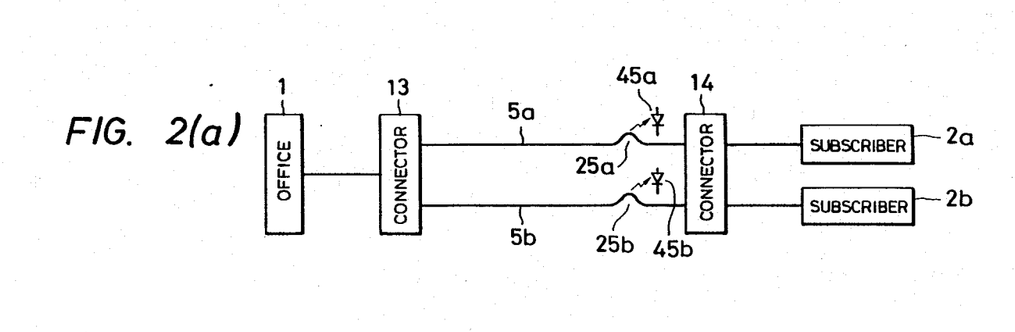
FIGS. 2(a) and 2(b) are system diagrams for an embodiment of the first aspect of the present invention.
Figure 2B:
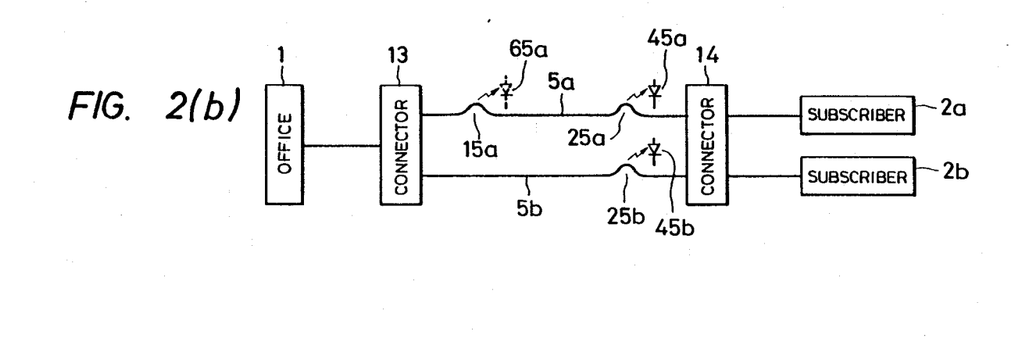

FIGS. 2(a) and (b) illustrate an embodiment of the first aspect of the present invention which relates to a method of coated fiber identification in an optical transmission network. As shown, this embodiment assumes that an office 1 is connected to subscribers 2a and 2b via two fibers 5a and 5b that are installed between a connector 13 on the office side and a connector 14 on the subscriber side in such a way as to provide for bidirectional communication.

In the first step of the method according to the first aspect of the present invention, the two coated fibers 5a and 5b are bent in the area near the connector 14 to form bent portions 25a and 25b as shown in FIG. 2(a), and radiated light leaking from these bent portions is detected with light-receiving devices 45a and 45b, respectively. Since only radiated light needs to be obtained from the bent portions 25a and 25b, the bent portions 25a and 25b may have a fairly large radius of curvature. Therefore, these bent portions will neither deteriorate the quality of an optical signal being transmitted nor cause cracking in the coated fibers.

In the next step, the fiber 5a to be identified is bent at the upstream end of optical signal transmission near the connector 13 to form a bent portion 15a as shown in FIG. 2(b), thereby producing radiated light in that bent portion 15a. If necessary, a light-receiving device 65a may be used to confirm the production of radiated light at the upstream end of the optical transmission network.

In the final step, the level of radiated light occurring at the downstream end of the optical transmission network when a given level of radiated light is produced in the bent portion 15a at the upstream end, is measured in terms of the level of light received by the light-receiving devices 45a and 45b at the downstream end thereof. This enables correct identification of the coated fiber 5a since the level of radiated light leaking from the bent portion 25a at the downstream end drops as a result of the formation of the bent portion 15a at the upstream end. Again the bent portion 15a is formed for the sole purpose of producing radiated light, so it may have a sufficiently large radius of curvature to effectively avoid deterioration in the quality of an optical signal being transmitted or cracking from occurring in the coated fibers.

It should be understood that the first aspect of the present invention is in no way limited to the embodiment described above and that various modifications can be made without departing from the spirit or scope of the invention.

Figure 3A:
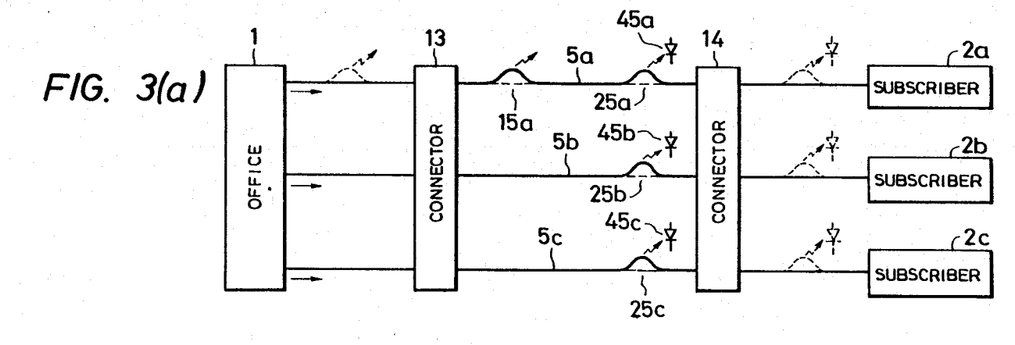
FIGS. 3(a) and 3(b) are diagrams showing a modification of the system showing FIGS. 2(a) and 2(b)
Figure 3B:
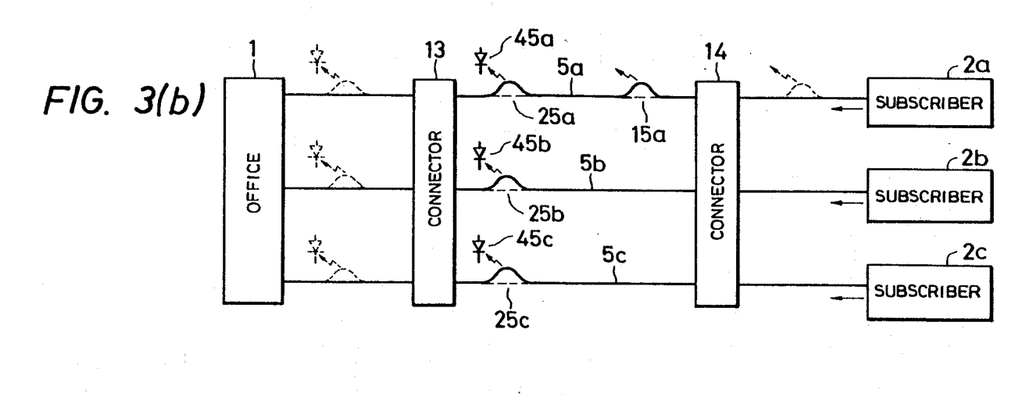

FIGS. 3(a) and 3(b) are schematic representations of a system incorporating one of such modifications. As FIGS. 3(a) and 3(b) show, the number of coated fibers may be increased to three (5a-5c). If desired, four or more fibers may be installed. The concept of the present invention is applicable not only to the case shown in FIG. 3(a) where information is carried in one way from the office 1 to subscribers 2a-2c, but also to the case shown in FIG. 3(b) where information is carried exclusively from the subscribers 2a-2c to the office 1. If necessary, the fibers may be bent between the office 1 and the connector 13 and between the subscribers 2a-2c and the connector 14, as shown by dashed lines in FIG. 2.

In the network shown in FIGS. 3(a) and 3(b), the same identification operation is carried out according to the above described steps.

An embodiment of the second aspect of the present invention which relates to a method of fiber identification in an optical transmission network is described hereinafter.

Figure 4A:
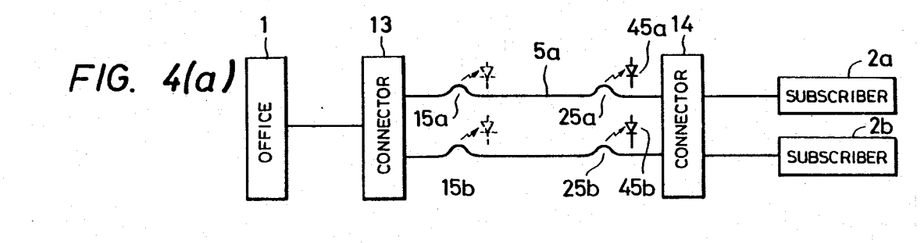
FIGS. 4(a) and 4(b) are system diagrams for an embodiment of the second aspect of the present invention.
Figure 4B:
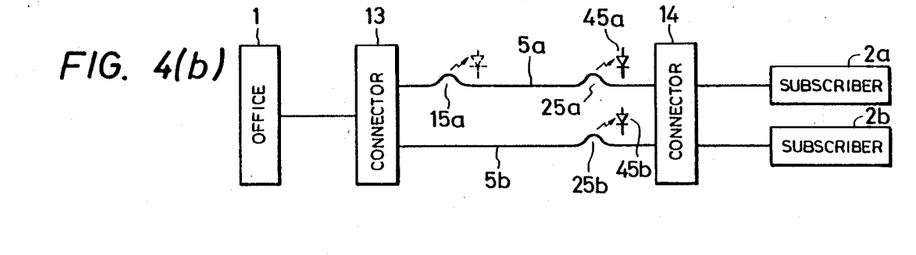

FIGS. 4(a) and 4(b) are system diagrams for this embodiment. It differs from the system shown in FIG. 2 in that in the first step of fiber identification, each of the fibers 5a and 5b is bent in areas neighboring both connectors 13 and 14 as shown in FIG. 4(a). By bending fibers 5a and 5b at each of the upstream and downstream ends of the optical transmission network as shown in FIG. 4(a), a low level of radiated light is detected by light-receiving devices 45a and 45b. Compared with the bent portions formed in the LI method, bends 15a, 15b, 25a and 25b formed in the method shown in FIG. 3 have sufficiently large radii of curvature to avoid deterioration of the quality of an optical signal being transmitted.

In the next step, the bend 15b in the fiber 5b to be identified is removed from the upstream end of the optical transmission network. As a result, no radiated light appears in the fiber 5b at the upstream end of the optical transmission network and an increased level of light is received by the light-receiving device 45b. Therefore, in the final step, the levels of radiated light leaking from bent portions 25a and 25b are compared to identify the fiber 5b of interest.

It should also be noted that the second aspect of the present invention is in no way limited to the embodiment described above and that various modification can be made without departing from the spirit or scope of the invention.

Figure 5A:
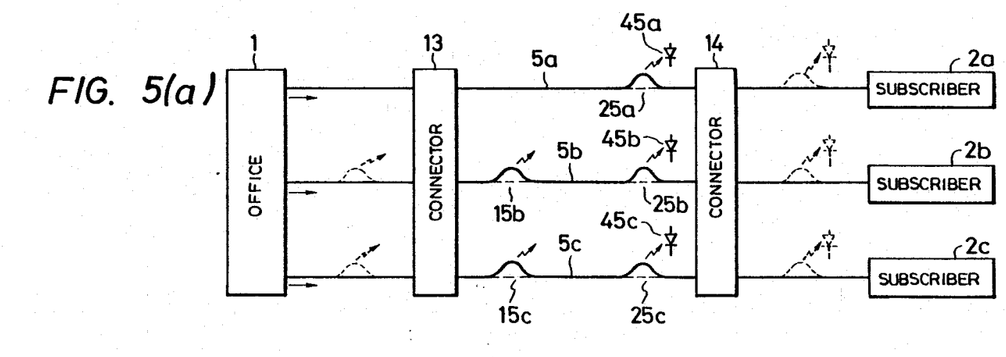
FIGS. 5(a) and 5(b) are diagrams showing a modification of the system shown in FIGS. 4(a) and 4(b)
Figure 5B:
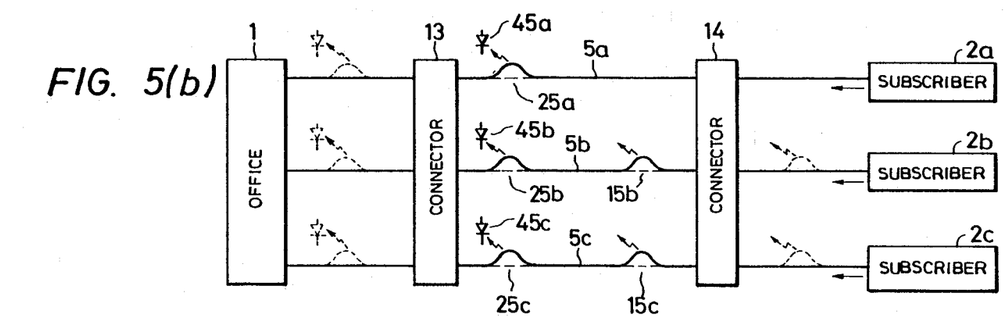

FIGS. 5(a) and 5(b) are schematic representations of a system incorporating one of such modifications. As FIGS. 4(a) and 4(b) show, the number of coated fibers may be increased to three (5a-5c). If desired, four or more coated fibers may be installed. The concept of the present invention is applicable not only to the case shown in FIG. 5(a) where information is carried in one way from the office 1 to the subscribers 2a-2c, but also to the case shown in FIG. 5(b) where information is carried exclusively from the subscribers 2a-2c to the office 1. If necessary, the fibers may be bent between the office 1 and the connector 13 and between subscribers 2a-2c and the connector 14, as shown by dashed lines in FIGS. 5(a) and 5(b).

In order to confirm the effectiveness of the present invention, the present inventor conducted the following experiment.

In the system as shown in FIGS. 5(a) and 5(b), the same identification operation is carried out according to the above described steps.

Figure 6:
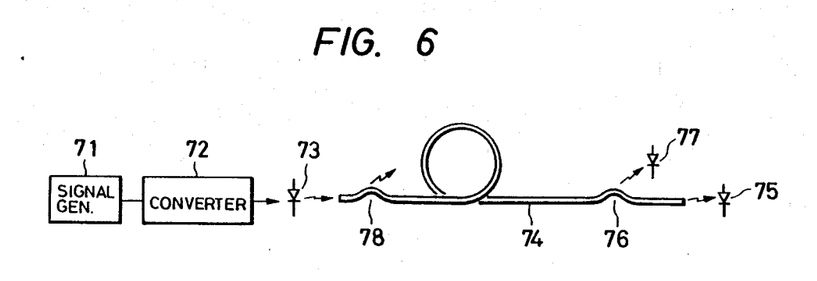
FIG. 6 is a diagram showing the composition of an experimental fiber identification system.

FIG. 6 shows the system configuration employed in this experiment. A random signal of 32 kb/sec is generated from a signal generator 71. The signal is fed into a converter 72 so as to be converted to a transmission code called CMI. This is used to directly modulate a laser diode 73 oscillating at 1.3 $\mu$m so that a laser light beam is launched into one end of a single-mode fiber 74 of a length of 1 km. A Ge photodiode 75 of large NA is set up to measure the level of an optical signal that would emerge from the other end of the fiber 74. In the experimental system described above, the Ge photodiode 75 read a signal level of $-7.38$ dBm from the fiber 74 when it is not bent at all.

In the next step, the downstream end of the fiber 74 is bent at an angle of 60 degrees to form a bent portion 76 having a diameter of 15 mm. The amount of radiated light leaking from the bent portion 76 is found to be $-26.61$ dBm by measurement with a Ge photodiode 77 of large NA. The level of light emerging from the optical fiber 74 (or the level of light received by the Ge photodiode 75) is found to be $-7.64$ dBm which is only 0.26 dB lower than the level produced from the unbent fiber.

Subsequently, the upstream end of the optical fiber 74 is bent at an angle of 60 degrees to form a bent portion 78 having a diameter of 15 mm. The amount of radiated light leaking from the bent portion 76 is found to be $-26.86$ dBm by measurement with the Ge photodiode 77 placed at the downstream end of the fiber 74. The level of light received by this diode is 0.25 dB lower than that received in the previous step. The level of light emerging from the optical fiber 74 (or the level of light received by the Ge photodiode 75) is $-7.94$ dBm. The decrease of 0.25 dB is found to be sufficient for the purpose of correct identification of the coated fiber 74.

As the above results show, the transmission loss caused by the formation of the bent portions 76 and 78 at the upstream and downstream ends of the optical fiber 74 is no more than $-0.56$ dB in total, which is found to be no problem at all since it is adequately smaller than 3 dB which is a guide for tolerable loss involving no deterioration in the quality of a signal being transmitted.

As a further advantage, CMI is a transmission code designed to have a duty ratio of 50%, so the power of light received at bent portions 76 and 78 at the upstream and downstream ends of the optical fiber is stable within the approximate range of $\pm0.02$ dB and will effectively eliminate the chance of erroneous fiber identification. In addition, CMI has a clock and can be picked up as a signal of 32 kb/sec by a Ge photodiode that has a small NA and high response speed. The present inventor has confirmed that the concept of the present invention is also effective for this approach, and further for a multimode fiber.

As described on the foregoing, the method of the present invention produces a bend in, or removes a bend from, an optical fiber to be identified or all other fibers at the upstream end of an optical transmission network so as to cause variation in the level of radiated light leaking from a bent portion in each of the fibers at their downstream end. The fiber of interest can be identified by checking the resulting variation in the level of radiated light. This method therefore allows for reliable fiber identification in an optical transmission network during transmission of an optical signal without disrupting the capabilities of an optical communication network or causing deterioration of the optical signal being transmitted.

What is claimed is:

1. A method for identifying an aimed coated fiber from a plurality of coated fibers in an optical transmission network at the upstream and downstream ends thereof during transmission of an optical signal comprising the steps of:

bending said coated fibers at downstream end sides thereof far from an optical signal source to produce radiated light from the bent portions thereof;

measuring the first levels of radiated light produced at the downstream end sides;

bending either the coated fiber to be identified or all remaining coated fibers at the upstream end side of the optical transmission network;

measuring the second levels of radiated light produced in the respective fibers at the downstream end side with the plurality of said fibers remaining bent at their downstream end side; and comparing the second levels of radiated light with the first levels of radiated light to detect variation in the level of radiated light, the aimed coated fiber being identified according to the detected variation.

2. A method according to claim 1 wherein the bending of said coated fibers is effected to such an extent that the quality of an optical signal being transmitted through said coated fibers is not degraded.

3. A method for identifying an aimed coated fiber from a plurality of coated fibers in an optical transmission network at the upstream and downstream end sides thereof during transmission of an optical signal comprising the steps of:

bending said coated fibers at both upstream end sides thereof near to an optical signal source and downstream end side far from said optical signal source to produce radiated light from the bent portions thereof;

measuring the first levels of radiated light produced at the downstream end sides;

removing either the bent portion at the upstream end side of said aimed coated fiber to be identified or the bent portions at the upstream end sides of said all remaining coated fibers;

measuring the second levels of radiated light produced in all of said respective coated fibers at the downstream end sides with said coated fibers remain bent at the downstream end sides ; and comparing the second levels of radiated light with the first levels of radiated light to detect variation in the level of radiated light, the aimed coated fiber being identified according to the detected variation.

4. A method according to claim 3 wherein the bending of said coated fibers is effected to such an extent that the quality of an optical signal being transmitted through said coated fibers is not degraded.

5. A method for identifying an aimed coated fiber from a plurality of coated fibers in an optical transmission network at the upstream and downstream ends thereof during transmission of an optical signal comprising the steps of:

bending one of said coated fibers at a downstream end side thereof far from an optical signal source to produce radiated light from the bent portion thereof;

measuring the first levels of the radiated light produced at the downstream end side;

bending the aimed coated fiber to be identified at the upstream end side of the optical transmission network;

measuring the second level of the radiated light produced in the one of said coated fibers at the downstream end side; and comparing the second level of radiated light with the first level of radiated light to detect variation in the level of radiated light, said steps being repeatedly carried out until the variation occurs and the aimed coated fiber being identified according to the detected variation.

6. A method according to claim 5 wherein the bending of said coated fibers is effected to such an extent that the quality of an optical signal being transmitted through said coated fibers is not degraded.

* * * * *